Figure 1:
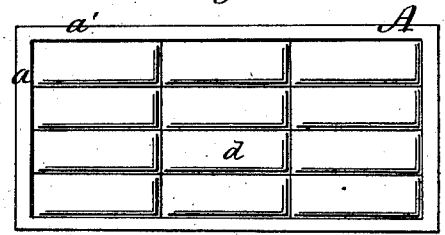

R. ADAM.
Mode of Setting Bread for Baking.

No. 216,300. Patented June 10, 1879.

Witnesses:
W. B. Masson
W. E. Bowen

Inventor
Richard Adam
by E. E. Masson
atty

UNITED STATES PATENT OFFICE.

RICHARD ADAM, OF RICHMOND, VIRGINIA.

IMPROVEMENT IN MODES OF SETTING BREAD FOR BAKING.

Specification forming part of Letters Patent No. 216,300, dated June 10, 1879; application filed March 25, 1879.

*To all whom it may concern:*

Be it known that I, RICHARD ADAM, of the city of Richmond, in the county of Henrico and State of Virginia, have invented a certain Improved Mode of Setting Bread, and devices for the same; and I do hereby declare that the following is a full, clear, and exact description of the invention, which will enable others skilled in the art to which it pertains to make and use the same.

This invention relates to a new method of setting bread. Under the present system, where the trade calls for oven-bottom bread, it is first weighed according to the size desired; then it is "half-molded" (terms used by all bakers) and put into large boxes, and when the required "proof" or lightness is given, then the bread is molded into any desired shape and placed into long boxes, each loaf separated from the other by a fold of cloth, either for brick or split bread, and each loaf is taken in hand and put into the oven from this long box, one at a time—a very tedious operation. The high round bread is placed in the long boxes in pairs and divided by a doubling up of cloth, as in the former case, and they are handled and put into the oven as removed from said cloth. This is distinct from the pan-bread, which is mostly made by the small bakers throughout the country. Every baker knows that pan-bread has not the sweet flavor that oven-bottom bread has. Necessity has driven the trade into making pan-bread, as so few persons can be found under the present system to place the bread properly in the oven where oven-bottom bread is called for.

With the use of my new method and means, the first part of the operation is the same as above mentioned, viz: The dough is divided and weighed into loaves of such a size as may be desired, then half-molded, then placed into large boxes or trays, where it obtains the required proof. Then it is molded into any shape desired, and each loaf is placed, bottom up and side by side with others, into my small boxes, into position to be delivered all together upon the peel. Under this new mode no cloth is needed between the loaves and no handling of them at this last stage. The peel is simply placed on the box of molded dough, and said box is inverted on the peel, and its load is put into the oven just as easily as a single loaf or a pair of loaves could be placed therein under the present system.

By this new and expeditious mode, called the "solid-box delivery," bread is handled with dispatch. Two or three hands can be kept overturning the boxes upon peels, the foreman at the same time emptying said peels into the oven as fast as they can be handed to him. The bread is placed in the oven in about one-fourth or one-fifth of the time now occupied, and consequently with much less waste of heat, the boxes holding ten or twelve loaves. In fact, the whole depth of the oven or of each shelf of a reel, if a reel-oven is employed, can be filled at one introduction, if wanted, by using larger boxes; but the size of the box given in the drawings can be more easily handled than a still larger box.

The contents or boxes of bread made in this way are kept in better shape and in every way preferable to anything under the old system with which I am acquainted.

This invention relates to a new method of preparing bread for baking, consisting in setting series of loaves of bread together, bottom up, in a box, allowing them to rise therein, placing a peel thereon, and inverting the box and peel together, and then removing the box, leaving the bread upon the peel ready for introduction into an oven.

It consists, also, in a box made for the purpose, with its bottom lined with cloth, in combination with a peel.

Figure 2:
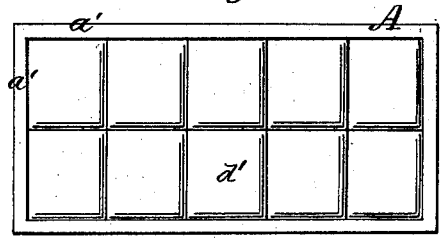
Figure 3:
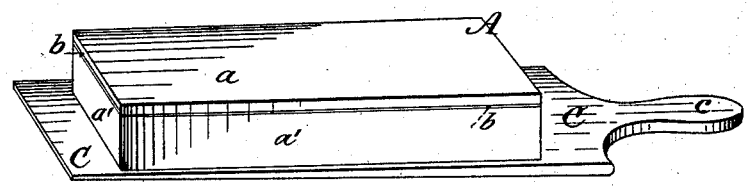
Figure 4:
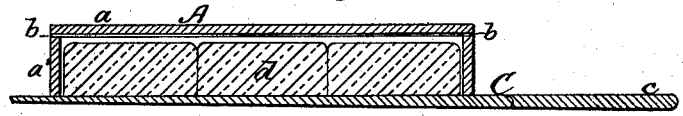
Figure 5:
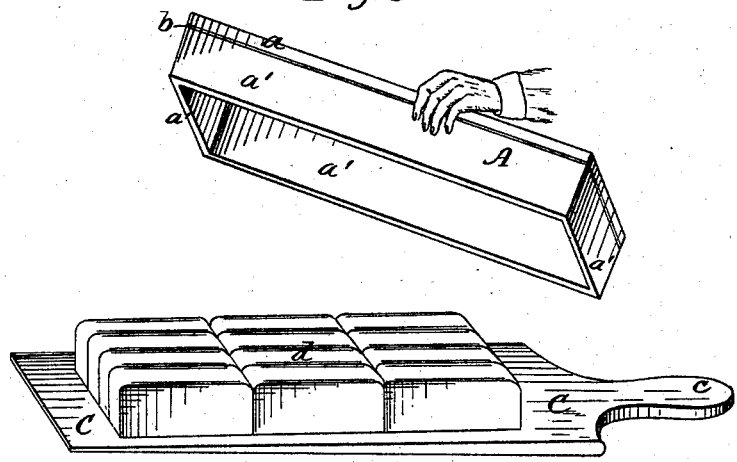

In the accompanying drawings, Figures 1 and 2 represent my boxes with loaves in, ready to be turned over on the peel. Fig. 3 represents one of the boxes and contents turned over on a peel. Fig. 4 represents the same in longitudinal vertical section. Fig. 5 represents bread on a peel ready for the oven, with box lifted off.

A represents the boxes used in my method. The size may vary according to the custom in different cities. The boxes shown in the drawings are intended to measure twenty-three inches and a quarter in length, ten inches and three-quarters in width, and three inches in depth. Boxes of that size will accommodate and retain in form twelve "brick" loaves, d, as in Fig. 1, or ten "high round" loaves, d', as shown in Fig. 2.

The boxes A are intended to receive the dough of a series of loaves after each has been weighed, half-molded, has the required proof, and has been remolded, and thus given its last form before being introduced into an oven. This last operation takes place when the dough has been raised nearly even with the top of the box.

The boxes A are made of light wood, preferably poplar, as it has no objectionable odor, and rectangular in form. Before joining the bottom a to the sides a', a piece of cloth or canvas, b, is stretched on the bottom, to remain clamped at the edges, between it and the sides, after the box is completed. Dough, as usually molded into loaves, does not readily adhere to such substance as cloth, and for this reason I thus line the bottom of the box.

The usual way to prevent dough adhering to utensils in which it may be placed is to dust the latter with flour, starch, &c.; but as the bottom of the box is to receive the top of the loaves, if any flour should be dusted there it would mar their appearance after they are baked; besides there would be greater expense. The sides of the box may also be lined with cloth; but I have found that in that position the smooth lumber of the box was sufficient, particularly if dusted from time to time.

Boxes may be made of wood and metal combined, one material being used for the bottom and the other for the sides; or they may be made entirely of metal, as tin or sheet-iron; but metal is objectionable. It is too sensitive to changes of temperature while the bread is rising. It also requires to be greased before use.

To insert the loaves into the oven, I make use of peels C, of sufficient size to receive the whole contents of a box at a time. Each one is provided with a handle, c, of the required length to suit the kind of oven in use.

Having now fully described my invention, I claim—

1. The above-described method of preparing bread for baking, consisting in setting series of loaves of bread together, bottom up, in a box, allowing them to rise therein, placing the peel thereon, and inverting the box and peel together, and then removing the box, leaving the bread upon the peel, ready for introduction into an oven, substantially as and for the purpose described.

2. The box A, as described, in combination with the peel C, substantially as and for the purpose set forth.

RICHD. ADAM.

Witnesses:
E. E. MASSON,
W. B. MASSON.